Patented Apr. 4, 1944

2,345,966

UNITED STATES PATENT OFFICE 2,345,966

PRODUCTION OF RESINS FROM FURANE DERIVATIVES

Edmond F. Fiedler, Adams, and Gustave D. Holmberg, Pittsfield, Mass., assignors to General Electric Company, a corporation of New York No Drawing. Application March 26, 1940, Serial No. 326,054

16 Claims. (Cl. 260—67)

This invention relates broadly to the production of resinous materials from polymerizable (resinifiable) liquid furane derivatives. More particularly it is concerned with the preparation of compositions comprising a polymerizable, liquid furane derivative, e. g., furfuryl alcohol, etc., and a placid polymerization catalyst, e. g., aniline hydrochloride, hydrochlorides of urea and urea derivatives, etc. These new liquid, polymerizable compositions are capable of being stored for a long period of time (e. g., three months or more) in the absence of air without loss of fluid state. They also are capable of relatively rapidly polymerizing to an insoluble, infusible, solid state under heat.

It was known prior to our invention that various liquid furane derivatives could be polymerized to solid state when admixed with a polymerization catalyst. For example, when furfuryl alcohol is mixed with 1 or 2 per cent by weight thereof of a mineral acid catalyst, e. g., sulfuric acid, hydrochloric acid, etc., a vigorous exothermic reaction occurs with the formation of a black, porous, insoluble, infusible, solid resinous mass. With a smaller amount of mineral acid catalyst, either alone or with a relatively large quantity of water, furfuryl alcohol polymerizes to an extremely viscous, tacky resinous mass or semi-solid body. However, regardless of the amount of mineral acid catalyst employed it has not been possible heretofore to obtain from furfuryl alcohol, or from mixtures of furfuryl alcohol and other polymerizable liquid furane derivatives, a low-viscosity, non-tacky composition that could be dehydrated without excessive polymerization to a fluid, potentially reactive (heat-convertible) resin adapted for use in coating, adhesive, impregnating and similar applications. (Commercial furfuryl alcohol contains a small amount of water, usually less than 3 per cent, which, together with water freed by reaction of the furfuryl alcohol with the acidic polymerizing agent, should be removed prior to, or during, partial or complete polymerization of the material; otherwise, the water becomes entrapped in the resinified compound and the product is unsuited for many commercial applications.)

We have discovered that the above difficulties in the production of resinous materials from polymerizable (resinifiable) liquid furane derivatives can be obviated and the fields of utility of such resins can be increased by using a placid curing or polymerization (resinification) catalyst instead of the active polymerization catalysts, e. g., mineral acids, aluminum chloride, zinc chloride, ferric chloride, sulfur chloride, phosphorus pentoxide, etc., heretofore employed or suggested. By a "placid polymerization catalyst," as used herein, is meant a substance effective in polymerizing (resinifying) a polymerizable (resinifiable) liquid furane derivative at the temperatures commonly employed (e. g., 20° to 200° C.) in polymerizing such compounds, the polymerization being effected without a violent, highly exothermic reaction and the rapid conversion of the furane derivative to a semi-solid or solid state. Examples of substances having this characteristic are the inorganic (mineral) acid salts of organic compounds, more particularly organic nitrogenous compounds.

In carrying the present invention into effect we prefer to use an inorganic acid salt (mineral acid salt) of a nitrogen-containing organic compound selected from the class consisting of amines and amides as the placid catalyst for the polymerization of the polymerizable liquid furane derivative. Examples of catalysts of this class are the mineral acid salts of urea, thiourea, substituted ureas such as methyl urea, acetyl urea, benzoyl urea, phenyl thiourea, asymmetrical diethyl urea, allyl urea, 2-chloroallyl urea, ethylidene urea, methylol urea, etc.; and mineral acid salts of other members of the urea system, e. g., guanidine iminourea, dicyandiamide, guanyl urea, biguanidine, aminoguanidine, aminotriazole, creatine, creatinine, guanoline, ethylene pseudosulfocarbamide derivatives, triazine derivatives, etc. The term "a urea" as used generally herein and in the appended claims is intended to include within its meaning substances such as just mentioned by way of illustration.

Other examples of placid polymerization catalysts of the preferred class are the mineral acid salts of ethanol amines such as mono- di and triethanolamines, triisopropanolamine, phenyl ethanolamine, ethyl phenyl ethanolamine, phenyl diethanolamine, diethylaminoethanol, ethylene diamine, diethylene triamine, triethylene tetramine, alkyl amines such as methyl amine, trimethyl amine, ethyl amine, propyl amine, etc., aryl amines such as aniline, benzyl amine, etc., acetoacetanilide, orthochloroacetoacetanilide, dichloroacetoacetanilide, morpholine, phenyl morpholine, etc.

Examples of acids which may be used in preparing the inorganic acid salts employed in carrying the invention into effect are the strong mineral acids such as the halogen acids, e. g., hydrochloric, hydrobromic, etc., sulfuric, nitric, etc.

The inorganic acid salts of amines and amides are particularly adapted for use as placid polymerization catalysts of polymerizable liquid furane derivatives selected from the class consisting of furfuryl alcohol and mixtures of furfuryl alcohol and furfural. By using these placid polymerization catalysts the polymerization of the polymerizable liquid furane derivative may be controlled so that polymerization takes place gradually, instead of practically immediately as with the prior catalysts. Hence the use of placid polymerization catalysts permits the production of low-viscosity liquid resins comprising a partially polymerized liquid furane derivative. By the prior technique it was impossible or impractical to obtain such resins from furfuryl alcohol or other polymerizable liquid furane derivatives.

In preparing the liquid, potentially reactive resinous compositions of this invention we mix a chosen liquid, polymerizable furane derivative, preferably furfuryl alcohol or a mixture of furfuryl alcohol and furfural (e. g., 10–90 per cent by weight furfuryl alcohol to 90–10 per cent by weight furfural) with a placid polymerization catalyst and then heat the resulting mixture for a period sufficient to initiate polymerization of the furane derivative but insufficient to cause it to lose its fluid state. Our preferred method of preparation includes the steps of mixing a liquid polymerizable furane derivative comprising furfuryl alcohol (or a mixture of furfuryl alcohol and furfural) with an inorganic acid salt of an organic nitrogenous compound selected from the class of amines and amides, dehydrating the resulting composition and adjusting the pH of the dehydrated mass to within the range of 4 to 6.

The liquid, potentially reactive resins of this invention have great penetrating power. They can be stored for long periods of time, for example three months or more, in a closed container without converting to an insoluble and infusible, solid state. They are especially suitable for use as solventless varnishes, in bonding wood veneers, for laminating sheets of paper, cloth, etc., in the production of wire enamels, as acid-resisting mortars for constructing acid-resisting brick walls, as impregnants of concrete, wood, asbestos, glass fibers in felted, woven or other form, fabricated bodies with interstices such as the windings of electrical coils, etc., in casting applications and for many other purposes. They may be used in unmodified state or after incorporating therein various addition agents such as organic and inorganic fillers, for example sand, pumice, asbestos, mica dust or flakes, powdered glass, fire clays, bentonite, powdered magnesia, chromites, iron oxides, powdered metals, wood flour, alpha cellulose, sheets or cuttings of cloth, paper, etc., also dyes, pigments, natural and synthetic resins, etc.

After application to the material to be treated, the modified or unmodified liquid polymerizable resins having incorporated therewith a placid polymerization catalyst may be polymerized, with or without the application of pressure, to an insoluble infusible state practically resistant to the destructive effect of other chemical bodies such as acids, alkalies, etc. Polymerization to solid state may be carried out at temperatures varying from, for example, room temperature (20° to 25° C.) to 200° C. or more, but preferably is carried out at about 50° to 150° C.

In order that those skilled in the art better may understand how the present invention may be carried into effect the following examples are given by way of illustration and not by way of limitation. All parts are by weight.

Example 1

| | Parts |
|---|---|
| Furfuryl alcohol | 100 |
| Urea mono-hydrochloride | 1 | are mixed in a standard resin kettle fitted with a reflux condenser and stirrer. The temperature is raised to 90° C. to start the reaction, which is exothermic. After the reaction has subsided, as evidenced by a decrease in temperature, heat is applied to keep the mix refluxing for about one-half hour after the start of the exothermic reaction. The resin then is dehydrated under a vacuum of about 25 inches mercury to remove the free water and the water of reaction. At first the temperature drops to approximately 60° C., but then rises slowly as vacuum distillation is continued. When a resin temperature of about 90° C. is reached, the application of vacuum is stopped and the resin is cooled. The resulting resin is a dark-colored, low-viscosity, non-tacky resinous mass.

The pH of the cooled, liquid resin preferably is adjusted to provide optimum storage stability and optimum rate of polymerization when the mass subsequently is polymerized to solid state in air at normal or at elevated temperatures. Usually the resin is adjusted to a pH of about 4 to 6, preferably to a pH of about 4.5. The addition of approximately 0.5 per cent (by weight of the resin) of hexamethylene tetramine generally brings the mass to a pH of about 4.5. Of course, other alkaline substances may be employed to adjust the pH of the resinous mass, e. g., calcium and barium hydroxides, alkali-metal hydroxides and carbonates, e. g., sodium and potassium hydroxides and carbonates, ethanolamines, alkyl amines, e. g., methyl amine, ethyl amine, etc., aryl amines, e. g., aniline, benzyl amine, etc., ammonia, mixtures of ammonia and amines, etc.

A resin prepared as above described has a specific gravity of about 1.215. It has excellent storage stability and can be stored for three months and more in a closed container without loss of fluidity. When heated in air at a temperature of about 75° to 80° C. it polymerizes in about 4 to 5 hours to a dense, black, insoluble and infusible resinous mass.

Example 2

| | Parts |
|---|---|
| Furfuryl alcohol | 1,000 |
| Aniline hydrochloride | 4 | are mixed in a suitable container and reaction allowed to proceed for one-half hour while the container and contents are heated by a bath maintained at about 103° C. The resulting mass is dehydrated under a vacuum of about 25 inches mercury until an internal resin temperature of about 90° C. is reached. The pH of the cooled, liquid resin preferably is adjusted as described under Example 1. The addition of approximately 1 per cent (by weight of the resin) of aniline is usually sufficient to bring the resin to the preferred pH, which is about 4.5. This resin has a specific gravity of about 1.2, has good storage stability, and may be polymerized to solid state as described under Example 1.

It will be understood, of course, that my invention is not limited to the use of the particular ingredients named in the above illustrative examples. Thus, instead of using aniline hydrochloride or urea mono-hydrochloride I may use any other placid polymerization catalyst, numerous examples of which previously have been given. The amount of catalyst employed may be varied considerably depending upon such factors as, for example, the particular catalyst and the particular furane derivative employed, the conditions of dehydration of the catalyzed mass, the temperature of polymerization to solid state, and the particular properties desired in the partially polymerized liquid resin and in the completely polymerized solid resin.

Also, polymerizable liquid furane derivatives other than furfuryl alcohol may be polymerized by practicing the present invention. Illustrative examples of such furane derivatives are the alkyl furane alcohols, e. g., the methyl furfuryl alcohols, the ethyl furfuryl alcohols, etc.; the halofurfuryl alcohols, e. g., the chloro- bromo- and fluoro-furfuryl alcohols and homologous alcohols, etc.; the furfuryl aldehydes, e. g., furfuryl acrolein, etc; the halofurfurals, e. g., the chloro-, bromo- and fluoro-furane aldehydes, etc.; the furfuryl ketones, e. g., furfuryl acetone, etc.; the furfural acetals and hemiacetals, e. g., furfuryl formal, furfuryl propional, furfuryl furfuryl furfurals, etc. Mixtures of these liquid polymerizable furane derivatives also may be employed.

The liquid resinous compositions of this invention are homogeneous, non-tacky masses which are practically insoluble in alcohol, but soluble (in most cases) in dioxane, ethyl acetate, toluene, benzene and ethylene glycol monoethyl ether. Liquid resins produced from furfuryl alcohol are, when freshly prepared, miscible with acetone but gradually become immiscible as the resin advances toward the insoluble, infusible state.

Samples of a solid resin produced from furfuryl alcohol catalyzed with a placid polymerization catalyst, dehydrated, and then polymerized to solid state under heat, with or without the addition of a further amount of a placid polymerization catalyst, have these typical characteristics:

Amount of water absorbed after
 65½ hours' immersion in water maintained at a temperature of about 40° C. per cent__  0.7 to 1.2
Dielectric strength of ½ mil coating on copper__volts per mil _____  Approximately 800 to 1000
Action of concentrated sulfuric acid after the resin was immersed therein for 48 hours at room temperature_____Nil
Action of strong sodium hydroxide solution after the resin was immersed therein for 72 hours at 100°_____ Nil The compositions of this invention, in addition to the uses hereinbefore mentioned, also are especially adapted for the production of cork gaskets and in bonding such gaskets to non-porous material, e. g., metals such as iron, steel, etc. They also are suitable for sealing leaks in containers for liquids having no appreciable dissolving action upon the cured resin, e. g., containers for oil, water, gasoline, alcohol, etc. Compositions comprising an inorganic filler and the liquid polymerizable resinous compositions of this invention are particularly suited for use as mortars for brickwork constructions which may be exposed to acids or acidic conditions. These new mortars are capable of setting to solid state and in such state are resistant to acids. In preparing such mortars various inorganic fillers in powdered, granular or other form advantageously may be incorporated with the liquid resinous mass containing the placid polymerization catalyst. Powdered or granular siliceous fillers ordinarily are quite satisfactory as the filler component of the mortar. The mortar, after application to the facing surfaces of the materials to be bonded together, hardens relatively rapidly under heat or, more slowly, at normal atmospheric temperatures.

What we claim as new and desire to secure by Letters Patent of the United States is:

1. A liquid, polymerizable resinous composition capable of being stored for a long period of time in the absence of air without losing its fluid state and capable of relatively rapidly polymerizing to an insoluble, infusible solid state when heated in air, said composition comprising a polymerizable liquid furane derivative selected from the class consisting of furfuryl alcohol and mixtures of furfuryl alcohol and furfural and, as a polymerization catalyst therefor, a small amount of a salt selected from the class consisting of the strong mineral acid salts of amines and amides.

2. A composition as in claim 1 wherein the polymerizable liquid furane derivative is furfuryl alcohol..

3. A composition as in claim 1 wherein the polymerizable liquid furane derivative is a mixture of furfuryl alcohol and furfural.

4. A composition as in claim 1 wherein the polymerization catalyst is an inorganic acid salt of an amine.

5. A composition as in claim 1 wherein the polymerization catalyst is an inorganic acid salt of an amide.

6. A product comprising the insoluble and infusible composition of claim 1.

7. A liquid, polymerizable resinous composition comprising a dehydrated mixture containing furfuryl alcohol and a small amount of salt selected from the class consisting of the strong mineral acid salts of amines and amides.

8. A liquid, polymerizable resinous composition comprising a dehydrated mixture containing furfuryl alcohol and a strong mineral acid salt of a urea.

9. A liquid, potentially reactive resinous composition comprising a dehydrated mixture containing furfuryl alcohol and urea mono-hydrochloride.

10. A liquid, potentially reactive resinous composition comprising a dehydrated mixture containing furfuryl alcohol and a small amount of aniline hydrochloride.

11. The solid polymerized resinous composition of claim 7.

12. A mortar capable of setting to solid state and in such state being resistant to acids, said mortar comprising an inorganic filler and the liquid polymerizable resinous composition of claim 7.

13. The method of producing a liquid, polymerizable composition capable of being stored for a long period of time in the absence of air without losing its fluid state and capable of relatively rapidly polymerizing to an insoluble, infusible state under heat, said method comprising mixing with a polymerizable liquid furane derivative selected from the class consisting of furfuryl alcohol and mixtures of furfuryl alcohol and furfural a small amount of a salt selected from the class consisting of the strong mineral acid salts of amines and amides and heating the resulting mixture for a period sufficient to initiate polymerization of the said derivative but insufficient to cause it to lose its fluid state.

14. The method which includes the steps of mixing a liquid polymerizable furane derivative selected from the group consisting of furfuryl alcohol and mixtures of furfuryl alcohol and furfural with a small amount of a salt selected from the class consisting of the strong mineral acid salts of amines and amides, dehydrating the resulting composition, and adjusting the pH of the dehydrated mass to within the range of 4 to 6.

15. A liquid, polymerizable resinous composition capable of being stored for a long period of time in the absence of air without losing its fluid state and capable of relatively rapidly polymerizing to an insoluble, infusible solid state when heated in air, said composition comprising a polymerizable resinous product of heating a furane derivative selected from the group consisting of furfuryl alcohol and mixtures of furfuryl alcohol and furfural in the presence of not more than one per cent by weight of a polymerization catalyst selected from the group of salts consisting of strong mineral acid salts of amine and amides.

16. A liquid, polymerizable resinous composition comprising a dehydrated resinous product obtained by heating furfuryl alcohol with about 0.4 per cent by weight of aniline hydrochloride.

EDMOND F. FIEDLER.
GUSTAVE D. HOLMBERG.